United States Patent
Stage (10) Patent No.: US 6,957,084 B1
(45) Date of Patent: Oct. 18, 2005

(54) MODULAR SYSTEM AND RADIO HANDSET FOR COMMUNICATING BETWEEN ORIGINATING AND DESTINATION ENTITIES

(75) Inventor: Erling Bugge Stage, Soroe (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/913,277

(22) PCT Filed: Feb. 10, 2000

(86) PCT No.: PCT/EP00/01051

§ 371 (c)(1),
(2), (4) Date: Nov. 1, 2001

(87) PCT Pub. No.: WO00/48415

PCT Pub. Date: Aug. 17, 2000

(30) Foreign Application Priority Data

Feb. 12, 1999 (GB) .................................. 9903263

(51) Int. Cl.[7] .............................. H04B 1/38; H04M 1/00
(52) U.S. Cl. ................ 455/557; 455/552.1; 455/554.2
(58) Field of Search ............................. 455/557, 552.1, 455/556.2, 567, 568, 466, 463, 554.2, 558, 455/559

(56) References Cited

U.S. PATENT DOCUMENTS 5,297,142 A * 3/1994 Paggeot et al. ............. 370/461
6,240,297 B1 * 5/2001 Jadoul ......................... 455/466
6,272,359 B1 * 8/2001 Kivela et al. ................ 455/567

FOREIGN PATENT DOCUMENTS

EP 0790749 A2 8/1997
WO WO99/25141 5/1995

OTHER PUBLICATIONS

Adaptive Continuous Media Applications in Mobile Computing Environments, by 1997 IEEE.

* cited by examiner

Primary Examiner—Benny Tieu
(74) Attorney, Agent, or Firm—Antonelli, Terry, Stout and Kraus, LLP.

(57) ABSTRACT

A radio handset which includes a processor having a memory, for performing the functions of the handset by communicating between originating entities and destination entities. Some of the entities being within the handset and at least one being locatable within an ancillary device. The handset further includes an interface coupled to the processor having a radio transceiver arranged for coupling to the ancillary device and communicating therewith to enhance the functions of the handset, and routing apparatus, coupled to the processor. The routing apparatus is arranged to provide communication between an entity in the handset and an entity in the ancillary device by enabling the creation of a proxy entity in the handset for transaction with the entity in the handset.

19 Claims, 9 Drawing Sheets

FOR PHONE 2
IN FIG. 3

| SYMBOLIC ROUTING TABLE ||
|---|---|
| SYMBOLIC RESOURCE ADDRESS | OBJECT ADDRESS |
| CALL | 30 |
| SMS | 32 |
| PHONE BOOK | 34 |
| DEFAULT | 36 |
| DEFAULT | 38 |

(SERVER)
(SERVER)
(SERVER)
(APPLICATION)
(APPLICATION)

FIG. 5a

FOR ACCESSORY DEVICE 40 IN FIG. 3

| SYMBOLIC ROUTING TABLE ||
|---|---|
| SYMBOLIC RESOURCE ADDRESS | OBJECT ADDRESS |
| PHONEBOOK | 42 |
| DEFAULT | 44 |

(SERVER)
(APPLICATION)

MODULAR SYSTEM AND RADIO HANDSET FOR COMMUNICATING BETWEEN ORIGINATING AND DESTINATION ENTITIES

BACKGROUND OF THE INVENTION

1. Field of the Invention

The present invention relates to a radio handset and relates to an ancillary device. It particularly relates to a radio handset arranged to augment its functionality by communicating with the ancillary device.

2. Description of the Prior Art

Radio handsets, especially cellular phones, are becoming increasingly popular. Handset manufactures are increasingly adding new features to their handsets to broaden their field of application or desirability. However, the augmentation of features has two associated problems. The first is that increasing a phone's features for example through the use of add-on modules for attachment to the handset may result in the handset becoming large and unwieldy. The second is ensuring that there is backward compatibility between future and presently unknown features and handsets already in the marketplace. The handsets need to be designed so that users can make use of future features without having to adapt or replace their handsets.

SUMMARY OF THE INVENTION

It would be desirable to provide a handset whose functionality can be augmented. It would be desirable if such augmentation did not structurally alter the handset. It would be desirable if the handset's functionality could be augmented in a predefined standard manner.

According to one aspect of the present invention there is provided a radio handset comprising: processor means including memory, for performing the functions of the handset by communicating between originating entities and destination entities, some of said entities being within the handset and at least one being locatable within an ancillary device; an interface coupled to the processor means and having a radio transceiver arranged for coupling to the ancillary device and communicating therewith to enhance the functions of the handset; and routing means, coupled to the processor means, and arranged to provide for communication between an entity in the handset and a entity in the ancillary device by enabling the creation of a proxy entity in the handset for transaction with the entity in the handset, the creation of a proxy entity in the ancillary device being for transaction with the entity in the ancillary device and communication between the handset and ancillary device through the interface.

According to another aspect of the present invention there is provided an ancillary device for augmenting the functionality of a radio handset which performs its functions by communicating between originating entities and destination entities, some of said entities being within the handset, comprising: at least one entity; a second interface having a radio transceiver for communicating with the radio handset; routing means arranged to provide for communication between an originating entity and a destination entity using one or more transactions and, if necessary, communication with the handset, at least one transaction involving two entities in the ancillary device, wherein the routing means is arranged to provide for communication between an entity in the radio handset and the entity in the ancillary device by creating a proxy entity in the ancillary device for transacting with the entity in the ancillary device and communicating via the interface.

According to another aspect of the present invention there is provided a modular system comprising distributed modules including a radio handset and an ancillary device, said radio handset and ancillary device being arranged to use radio communication to enhance the handset's functionality, the radio handset comprising: processor means including memory, for performing the functions of the handset by communicating between originating entities and destination entities, some of said entities being within the handset and at least one being within the ancillary device; a first interface coupled to the processor means and having a radio transceiver arranged for coupling to the ancillary device and communicating therewith to enhance the functions of the handset; and first routing means, coupled to the processor means, and arranged to provide for communication between an originating entity and a destination entity using one or more transactions and, if necessary, communication to the ancillary device, at least one transaction involving two entities within the handset, the ancillary device comprising: at least one entity; a second interface having a radio transceiver for communicating with the first interface; second routing means, for coupling to the first routing means via the interface, and arranged to provide for communication between an originating entity and a destination entity using one or more transactions and, if necessary, communication with the handset, at least one transaction involving two entities in the ancillary device, said first and second routing means being arranged to provide for communication between an entity in the radio handset and an entity in the ancillary device by enabling the creation of a proxy entity in the handset for transaction with the entity in the handset, the creation of a proxy entity in the ancillary device for transaction with the entity in the ancillary device and communication between the handset and ancillary device via the interface.

The functionality of the handset is achieved by accessing an ancillary device using a radio transceiver. Consequently increased functionality can be achieved without physical adaptation of the handset or using add-on attachable modules.

The handset uses standard transactions within itself and a proxy entity to communicate with the ancillary device. The proxy entity provides a standard interface by which the ancillary device and handset communicate and ensures the independence of handset from the ancillary device. The ancillary device uses standard transactions within itself and a proxy entity to communicate with the handset. The proxy entity provides a standard interface by which the ancillary device and handset communicate and ensures the independence of ancillary device from the handset. Thus the proxy entities take care of communication between the handset and ancillary device and effectively de-couple the handset and ancillary device. This allows for easy upgrade of the handset's features and for the features provided by the ancillary device to be backward compatible.

The handset need only access the ancillary device when it or its user requires access to the features provided by the ancillary device.

BRIEF DESCRIPTION OF THE DRAWINGS

For a better understanding of the present invention and to understand how the same may be brought into effect reference will now be made by way of example only to the accompanying drawings in which.

DETAILED DESCRIPTION OF THE INVENTION

Figure 1:
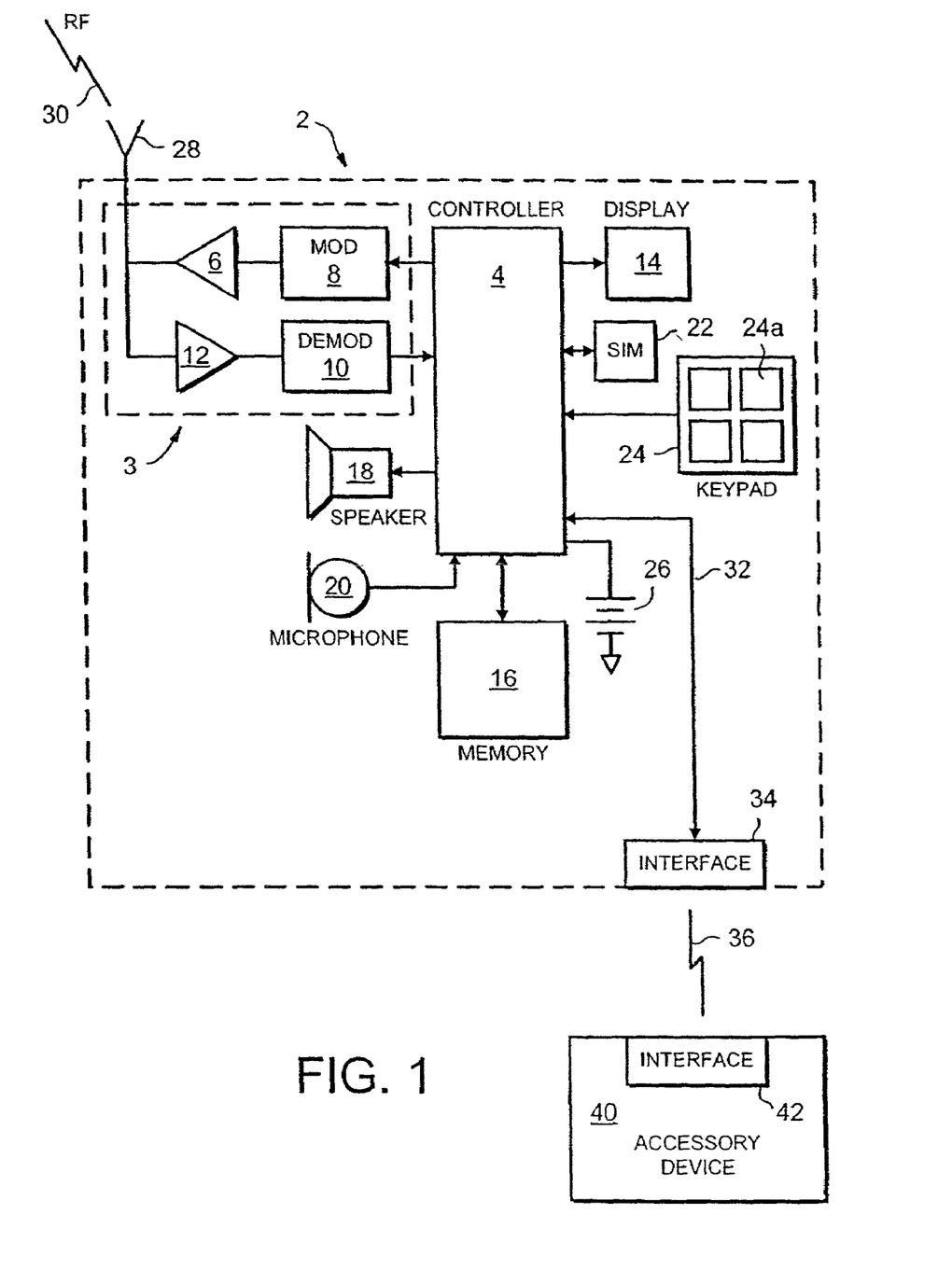
FIGS. 1 and 2 illustrate a radio handset and ancillary device.
Figure 2:
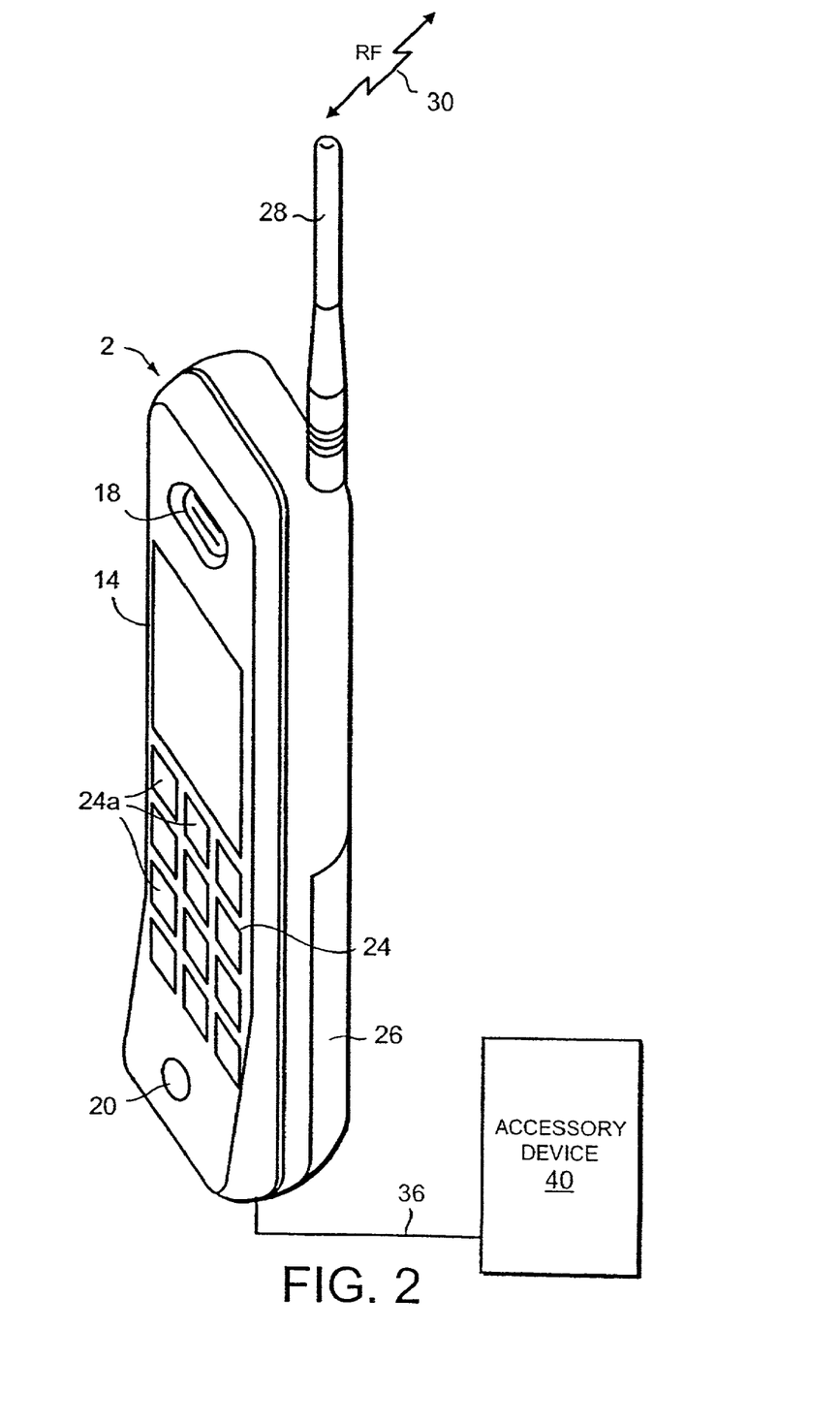

FIGS. 1 and 2 illustrate a hand-portable radio communications device, henceforth referred to as a terminal or radio handset 2. The terminal 2 is small enough to be carried by hand and is preferably sized to fit into a pocket of a jacket. The terminal communicates with other terminals or devices using radio waves.

The terminal 2 has a user interface comprising, for input, a keypad 24 having keys 24a and a microphone 20 and, for output, a speaker 18 and a display 14. The size of keypad 24 and display 14 are necessarily limited by the size of the terminal 2. The terminal 2 is controlled by controller 4 and is powered by battery 26. The controller 4 receives signals from the microphone 20 and the keypad 24 and provides signals to the display 14 and the speaker 18. The terminal 2 has an interface 34 and a transceiver 3, which are used to communicate outside the terminal 2. The interface 34 is connected to the controller via bus 32. The interface may include a transceiver for radio or infra red communication and/or a port for direct electrical connection. The transceiver 3 is a radio frequency transceiver connected to an antenna 28 and controller 4. It is arranged to communicate via a radio frequency interface 30. The transceiver 3 includes a modulator 8 for modulating signals received from the controller 4 and a transmitter 6 which presents the modulated signals to the antenna 28. The transceiver 3 also includes a receiver 12 which processes signals received at the antenna 28 and provides them to a demodulator 10 which provides demodulated signals to the controller 4. The terminal 2 has a RAM memory 16 which is connected to the controller 4 via a bus. The terminal also has a SIM memory 22 connected to the controller 4 which provides information allowing the terminal 2 to function as a mobile phone. When functioning as a mobile phone, the terminal 2 transmits and receives radio frequency signals via the antenna 28.

The terminal 2 is connected to an interface 42 of an accessory device 40 via the interface 34. The connection 36 between the interface 34 and interface 42 may be achieved in a number of ways. For example radio waves could be used. One suitable radio communication protocol is the wireless applications protocol (WAP) described in "WAP Architecture Version 30 Apr. 1998". This requires the interface 34 to comprise a WAP stack and a radio transceiver and the interface 42 to likewise comprise a WAP stack and radio transceiver. Another suitable protocol is the Bluetooth protocol described in co-pending UK Patent Application No 9820859.8, the contents of which are hereby incorporated by reference, which requires the interface 34 and interface 42 to include low power RF transceivers.

Although a single accessory device 40 is shown in FIGS. 1 and 2, the terminal 2 could make simultaneous connection with a plurality of such accessory devices. Although the transceiver 4/antenna 28 and the interface 34 are shown separately, they may be integrated.

The fundamental functions of the terminal 2 are provided by the combination of the controller 4 and the memory 16. The accessory device 40 may be accessed by the controller 4 via the bus 32 and interface 34 and thus enhance the functionality of the terminal 2.

The terminal 2 has a number of fundamental capabilities including system capabilities relating to its radio communication abilities (whether it involves the WAP, Bluetooth, GSM, AMPS or other communication protocols) and other capabilities which allow the terminal to provide the features of a database, a personal organiser, a word processor or a web browser. The fundamental capabilities are integrated together in a coherent way to provide the terminal's features.

The phone's fundamental capabilities are organized in logical groups as resources. Each resource is accessed through a "server". The server encapsulates the resource to provide an interface through which the resource is accessed. "Applications" access resources through the servers and link them together with logic to provide the terminal's features. The applications and resources are connected via a connectivity layer (CL).

Figure 3:
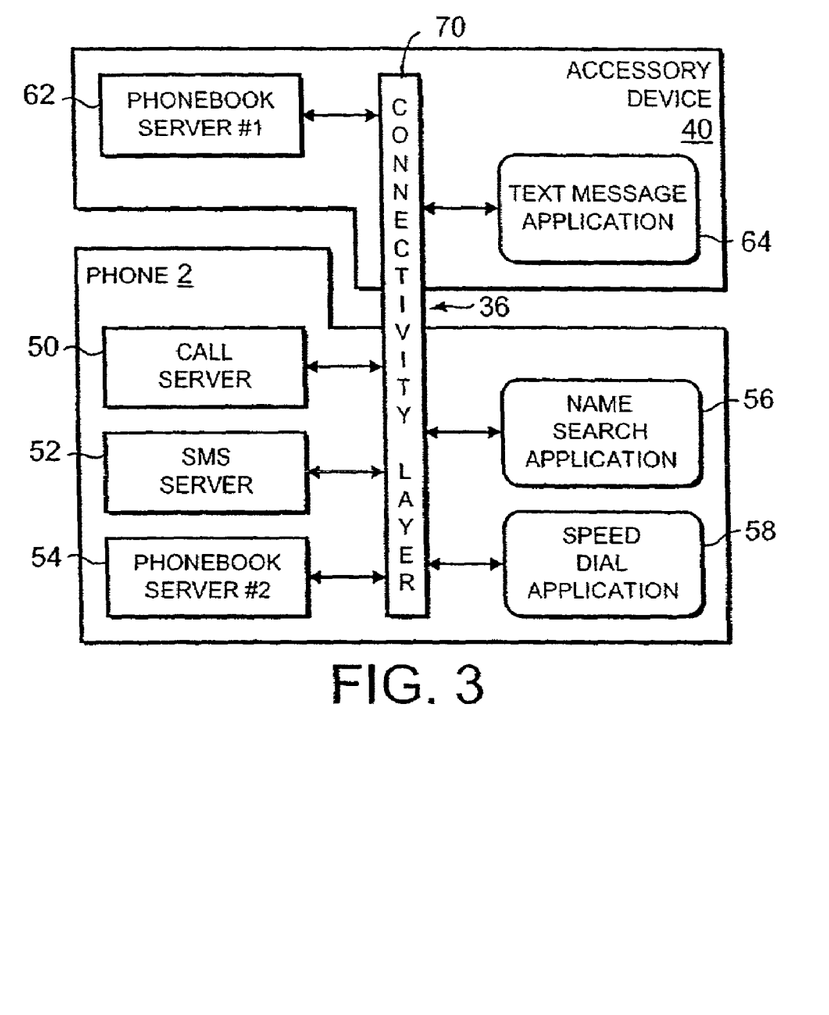
FIG. 3 illustrates the division of a phone's features between a handset and ancillary device.

FIG. 3, illustrates the divisions of the functions of a terminal 2 which is operating as a phone. The phone illustratively has a call server 50 which encapsulates the phone's capabilities to make and receive telephone calls, an SMS server 52 which encapsulates the phone's capabilities of making and receiving short message service (SMS) messages and a phone book server #2 54 which encapsulates a database associating names and telephone numbers. The phone has a name search application 56 which can be used to search for a name within the phone book database served by the phone book server #2 54 and a speed dial application 58 which can be used to make a call via the call server 50. The accessory device 40 has a phone book server #1 62, encapsulating a database associating phone numbers and names, and a text message application 64 for creating and editing text messages. The servers 50, 52 and 54 and applications 56 and 58 within the phone are connected to each other and to the server 62 and application 64 in the accessory device via the connectivity layer 70. The connectivity layer 70 via the interfaces 34 and 42 and the connection 36 provides for communication between the terminal 2 and the accessory device 40. When the accessory device 40 is connected to the phone via the connectivity layer the text message application 64 may be utilized via the phone and used to access the SMS server 52, in addition, the name search application 56 may access the phone book in the accessory device via the phonebook server #1 62 in the accessory device 40.

The controller 4 in the terminal 2 is typically a micro processor which is controlled by code. Within a terminal there may be a number of simultaneous functions which need to be carried out by the controller in parallel. However the controller may only be able to carry out one piece of code at a time and will have to task these functions. Tasking in this context means that the controller allocates its processing resources in a cyclic manner. That is it sequentially spends a short period of time on each task in an ordered series of tasks and then repeats the sequence. Tasks are therefore time division multiplexed but are logically distinct. Consequently over the course of several sequences the tasks necessary to perform a function are carried out. Using tasks allows the processing load on the controller to be balanced.

An application is a piece of code which runs on the controller 4. The application is defined in the memory as an object. The memory 16 is used in the terminal 2. This object has an object address allowing it to be addressed in the memory and is a specialization of a Connectivity Layer (CL) base class. The application uses the services of one or more servers to build features and can present these features to the user.

A server encapsulates a resource with a standard interface. It is an object stored in memory. The memory 16 is used in the terminal 2. The object has an object address allowing it to be addressed in the memory and is a specialization of the Connectivity Layer (CL) base class. Each server provides a service by controlling a resource or other server. It provides a standard interface to a resource which can be accessed only via the connectivity layer 70.

Applications access a server using a symbolic resource address which indicates the service required but not the object address of the server.

Figure 4:
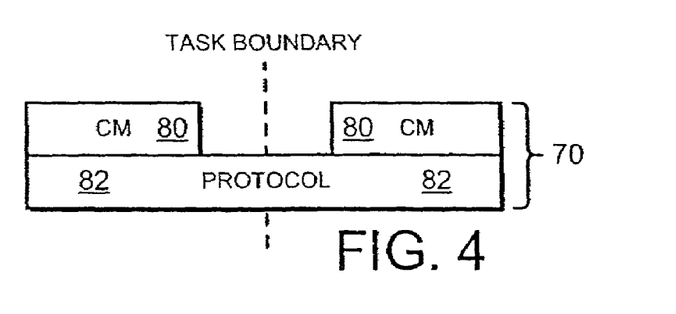
FIG. 4 illustrates the connectivity layer.

The connectivity layer 70 is illustrated in more detail in FIG. 4. The connectivity layer is a combination of communication managers (CM) 80 and message protocol 82. A single communications manager controls each task. The CM 80 transmits messages between objects within a task (intra-task messages) using transactions involving the source object of the message and the destination object of the message. The message protocol 82 controls the routing of messages between tasks (inter-task messages). The inter-task communication may take any one of a number of forms of communication such as WAP, Bluetooth or a bus to another device or to another task.

Figure 5A:
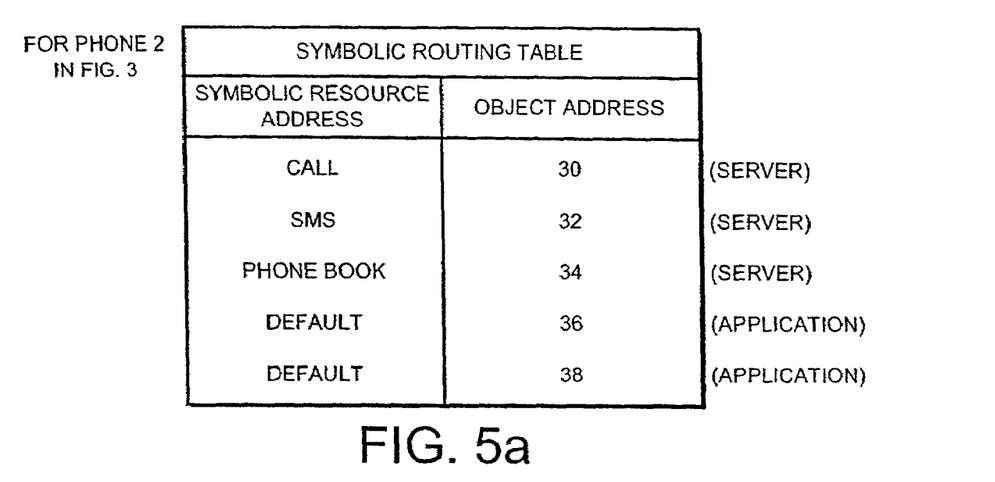
FIGS. 5a and 5b illustrate symbolic routing tables.
Figure 5B:
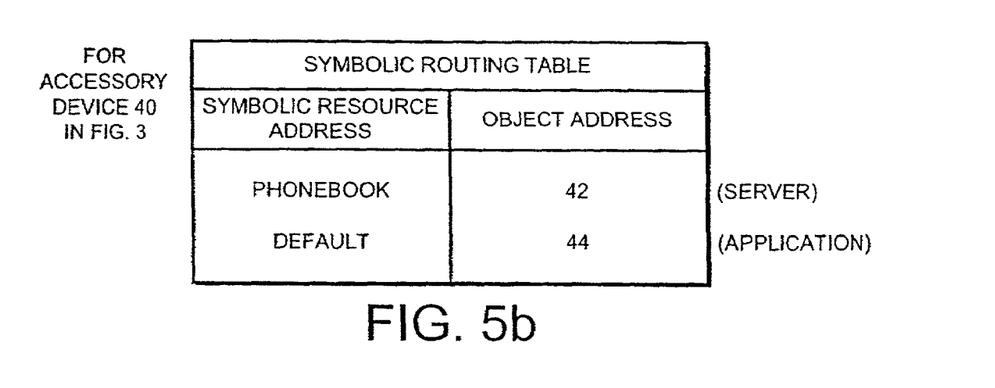

Each communications manager has a symbolic routing table. The symbolic routing table contains an entry for each object (each application and server), that the communications manager 80 interconnects to define its task, the local task. Applications do not have symbolic addresses and each application object address is associated with a default symbolic address. Each of the servers connected to the communications manager 80 has its object address associated with the symbolic address identifying the service provided by the resource it encapsulates. An example of a symbolic routing table for the Phone 2 in FIG. 3, assuming all the applications and servers are within the same task, is illustrated in FIG. 5a. An example of a symbolic routing table for the Accessory Device 40 in FIG. 3, assuming all the applications and servers are within the same task, is illustrated in FIG. 5b. For the sake of clarity the reference numbers used in FIG. 3 are illustratively used as object addresses.

The communications manager 80 can use the symbolic routing table to identify from a symbolic address provided by an application, whether the server associated with that symbolic address is within the local task and to provide the associated object address to the application. If the service requested by an application is not within the local task, the communications manager 80 passes control to the message protocol 82. The message protocol 82 sends the request from the original communications manager to the communications manager which is interconnected to the appropriate server. Any suitable protocol may be used to send these extra-task messages. Communication between tasks is asynchronous.

The communications manager queues intra-task messages. It handles extra-task messages such as those which need to go outside its local task and those received from outside its local task. The communications manager processes one message at a time and it is preferred for the communications manager to clear intra-task messages before servicing received extra-task messages.

The connectivity layer 70 hides the physical location of a resource behind a standard interface. The CL provides an indirect message routing mechanism which allows applications to use symbolic addressing to access an appropriate server and the resource it encapsulates by sending a request message. The CL allows the server to return the results of the access to the appropriate application by sending a reply message. Applications can access resources without knowing or caring where the resource or server which controls the resource is implemented. The resource may therefore be within the terminal 2 or the accessory device 40. The application needs to know only the symbolic address of a resource and the protocol for interfacing with the connectivity layer to be able to access and use it.

Figure 6:
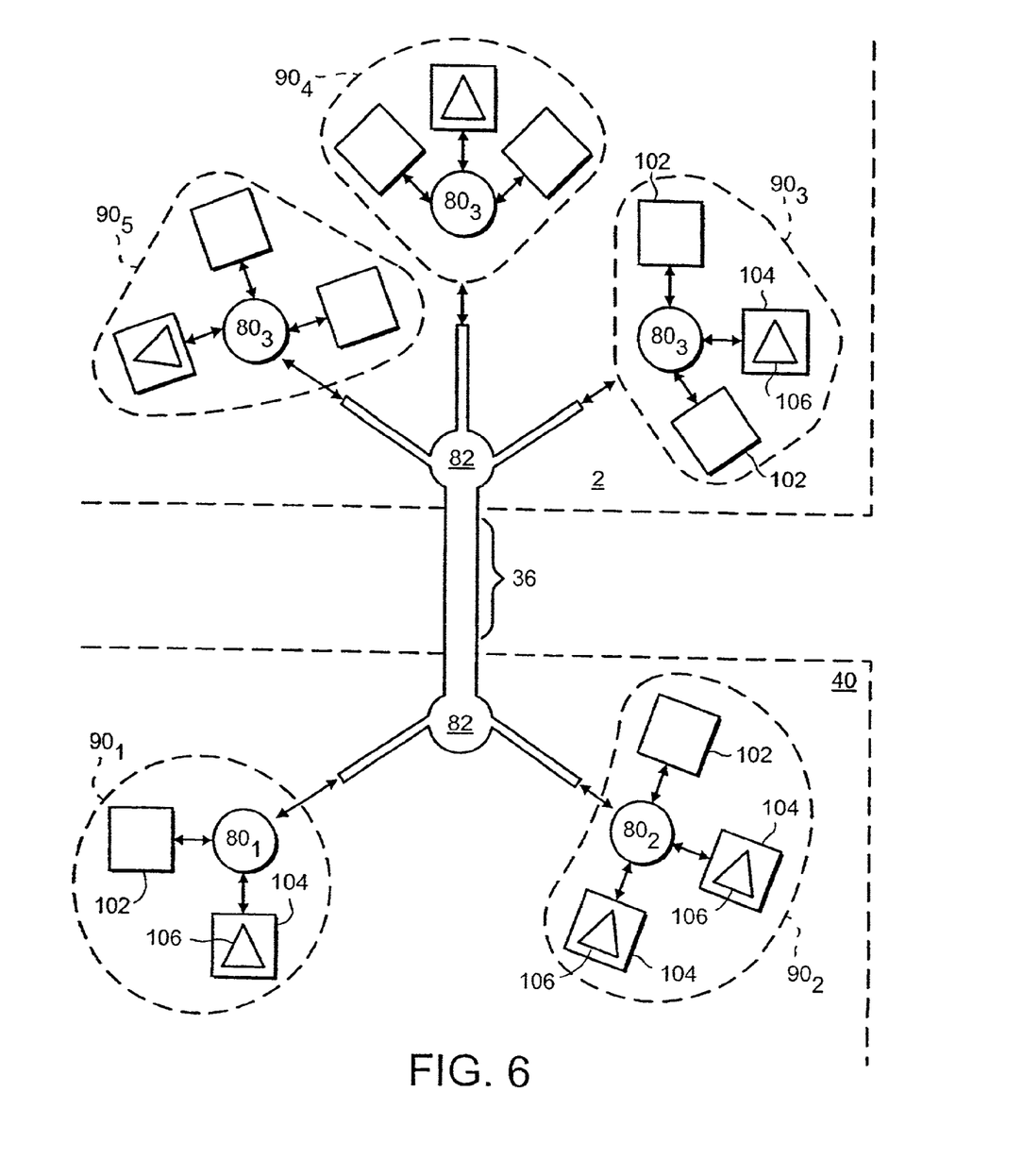
FIG. 6 schematically illustrates the tasks within the handset and the ancillary device.

FIG. 6 illustrates the terminal 2, connection 36 and the accessory device 40 previously described in relation to FIGS. 1 and 2. This drawing is schematic illustrating how the tasks $90_1$ and $90_2$ of the accessory device and the tasks $90_3$, $90_4$ and $90_5$ of the terminal are interconnected via the connectivity layer 70. Logically, a task may be considered to comprise applications and servers linked by a communications manager. The CM which is itself within the task defines, using the symbolic routing table, the objects (i.e. applications and servers) within the task it controls. The CM, and objects in a task are stored in "local" portions of the memory. Pointers can be used within this local memory to point to objects within the same task. Pointers should not be used to point from one task to another task as this may cause conflict between tasks and the use of the term "pointer" should be understood in this light.

The message protocol 82 interconnects each of the communication managers 80. FIG. 6 is illustrative of the independence of the different tasks $90_i$. The task boundaries are illustrated by dotted lines and the task boundaries do not overlap. Each task $90_i$ has an associated communications manager $80_i$ which is in two-way communication with the message protocol 82. The task also includes a number of objects 100. These objects may be applications 102 or servers 104. The servers encapsulate a resource 106.

An object within a task cannot directly communicate with another object, it can only communicate with the task's communications manager 80. The communications manager 80 effectively de-couples the applications from the services/resources they require. The application need only request the desired service from the communications manager 80 which then facilitates access to the necessary resource. This resource may be within the same task as the application or may be in another task within the same device or within a different device but linked to the original task via the message protocol 82. the destination server receives a request from the communications manager 80 within its own task and responds to that communications manager 80 the communications manager 80 ensures that the response is routed back to the correct application.

Figure 7:
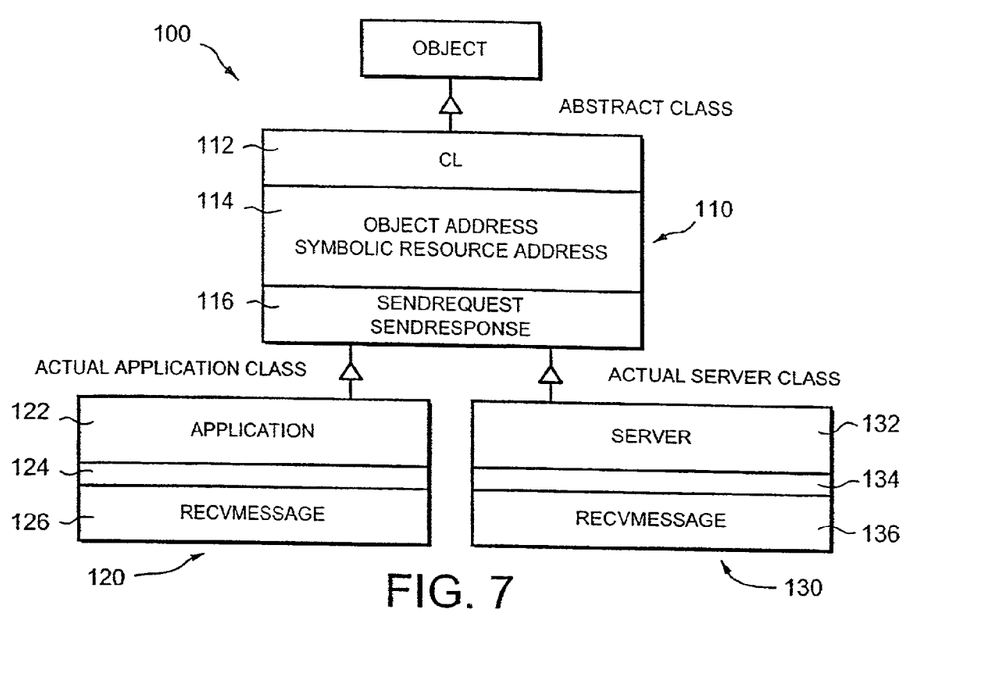
FIG. 7 illustrates the application object and server object.

FIG. 7 illustrates the object orientated encapsulation in the communication manager 80. A base or abstract class 110, henceforth referred to as the connectivity later (CL) class has three portions: the name 112, attributes 114 and functions 116. The abstract CL class has two specializations 120 and 130. The specialization 120 represents an application object 102. The specialization 120 has a name 122, attributes 124 (empty) and functions 126. The specialization 130 represents a server object and has name 132, attributes 134 (empty) and functions 136. The specializations 120 and 130 have a single function 126, the RECVMESSAGE function. The specializations themselves have no attributes.

A specialization of an abstract class uses the attributes 114 and functions 116 of the abstract CL class 110. The abstract CL class 110 includes as attributes an object address and a symbolic resource address. The functions of the abstract CL class 110 include the SENDREQUEST function and SENDRESPONSE function. All objects of the abstract CL class 110 therefore share the same attributes 114 and functions 118. The application object 102 additionally has a RECVMESSAGE function 126. The server object 104 additionally has a RECVMESSAGE function 136. An object can only invoke a function in (transact with) another object of the same task.

A first object (application or server) can request services from a resource encapsulated by a second object (server). This is achieved by sending a message to the other server and receiving a reply message therefrom. For first and second objects within the same task, the transactions in the CM 80 is as follows. The CM 80 operates differently if the second object is not within the local task.

Figure 8:
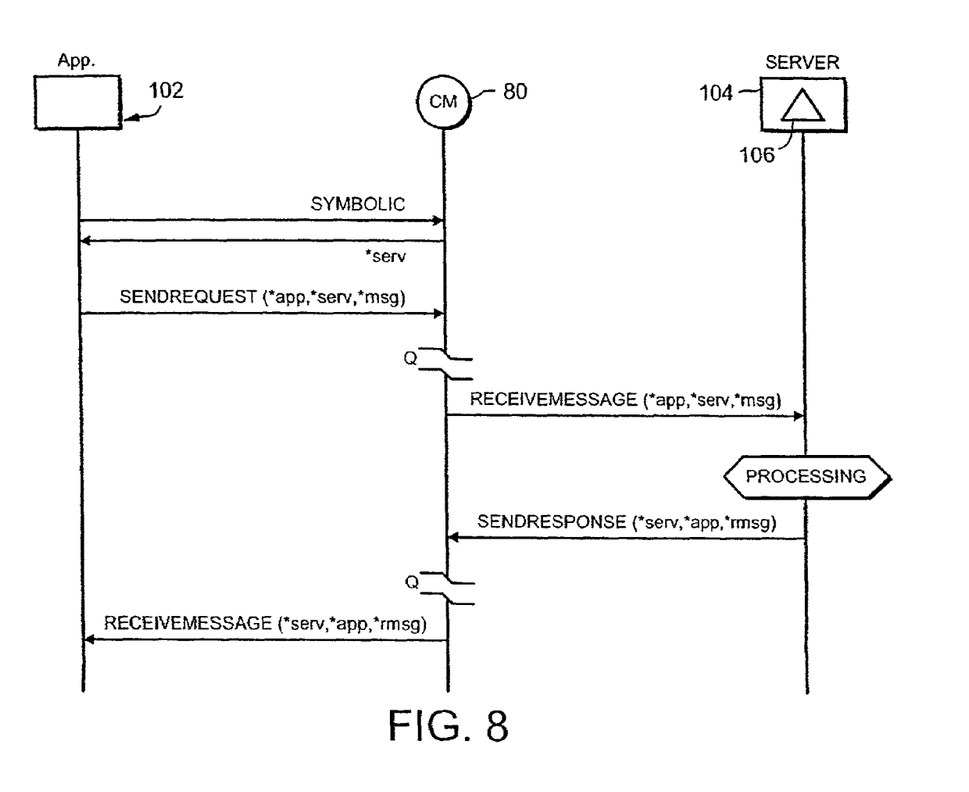
FIG. 8 illustrates inter-task message delivery.

The process of intra-task communication is illustrated in FIG. 8. The communications manager 80 mediates communication between an application 102 and the server 104 encapsulating a response 106. The application and server are within the same task 90. The application wishes to access a service. It is aware of the service it requires and the symbolic address of this service. It is not a ware of the object address of the server which provides this service. The application provides the symbolic address to the communications manager 80 and receives as a reply a pointer to the appropriate server *SERV. The communications manager uses its symbolic routing table to perform this function.

The application has an object address APP and a pointer to the application is designated *APP. The server has an object address SERV and a pointer to the server object is designated *SERV. The application sends a message MSG towards the server by calling the function SENDREQUEST with the arguments *APP, *SERV and *MSG where *MSG is a pointer to the message MSG. This function takes as its arguments a pointer to the originating first object (i.e. the first object's address), a pointer to the second destination object (i.e. the second object's address) and a pointer to the message body defining the service required. The communication manager queues the message and then send it onwards towards the server by calling the function RECVMESSAGE in the server. The RECVMESSAGE function has as its arguments *APP, *SERV and *MSG. The RECVMESSAGE function takes as its arguments a pointer to the first originating object (i.e. the first object's address), a pointer to the second destination object (i.e. the second object address) and a pointer to the body of the message. The server receives the message and processes it accessing the resource 106. It then sends a reply message (RMSG) towards the application. This is achieved by calling the function SENDRESPONSE in the application object 102. This function has as arguments *SERV, *APP and a pointer to the reply message RMSG, *RMSG. The communications manager 80 places this message on its internal queue. The reply message RMSG is then sent to the application by calling the function RECVMESSAGE in the application object. The RECVMESSAGE function has as its arguments *SERV, *APP and *RMSG. Thus the application receives the reply message.

It will therefore be appreciated that a first object communicates with a second object 62 via the communications manager 80 by sending messages. These messages are particular types of messages involving one or more transactions. Intra-task messages are initiated by the object from which the message originates calling a function in (transacting with) the object to which the message is directed. The function includes a pointer to the originating object, a pointer to the destination object and a pointer to the body of the message. The message, the first object and the second object are all within a local memory space allocated to a single local task by the CM 80. In this way, message delivery within a task is completely isolated from the message delivery in other tasks. A problem however arises when the server to which access is requested by an application or other server does not lie in the same local task as that application. The destination object does not lie within the same local task. This problem is addressed by creating a proxy object within the same local task as the originating object and a proxy object in the same local task as the destination object. The proxy objects in the originating task looks to the originating object as if it is the destination object and transacts with the originating object. The proxy objects in the destination task looks to the destination object as if it is the originating object and transacts with the destination object.

Figure 9:
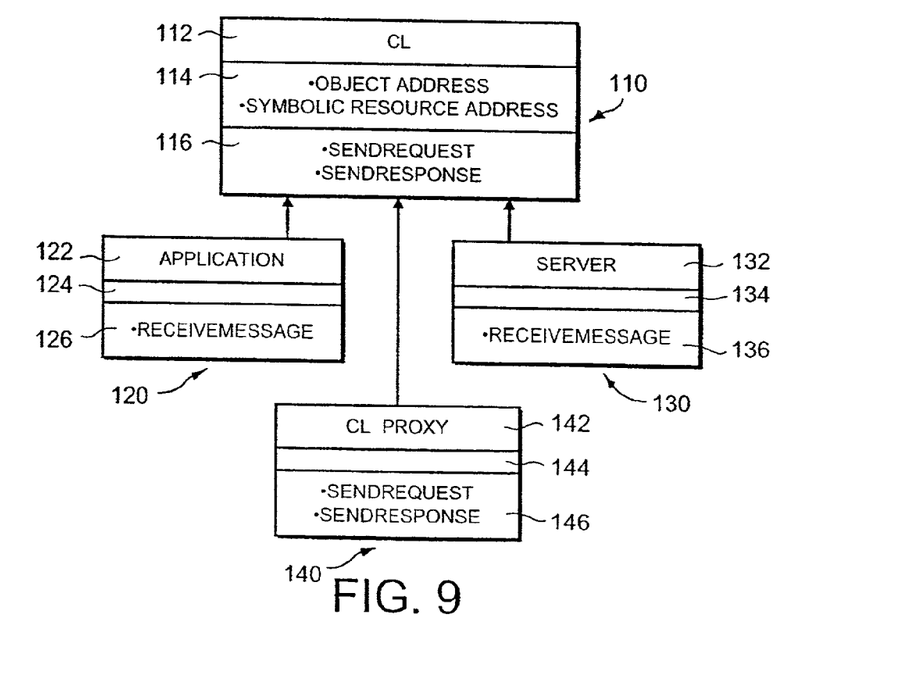
FIG. 9 illustrates the proxy object.

The proxy objects encapsulates the mechanism by which messages are sent between tasks. Consequently, a first object in a first task can send a message to a second object in a second task by transacting with a proxy object in the first task. The proxy object thereafter takes care of the communication from the first to second task through the message protocol 82. FIG. 9 illustrates the object orientated encapsulation in the communications manager 80 including the specialization 140 representing the connectivity layer (CL) proxy. The specialization 140 represents a proxy object 108. The specialization 140 has a name 142, attributes 144 (empty) and functions 146. The specialization 140 has two functions; the SEND REQUEST function and the SEND RESPONSE function. The effects of calling the SEND REQUEST function and SEND RESPONSE function in the CL proxy object are different to the effects caused when calling the SEND REQUEST or SEND RESPONSE functions in the application or server objects. The proxy object represents an object executing in another task, it is never the final destination for a message, but an interface between tasks.

Figure 10A:
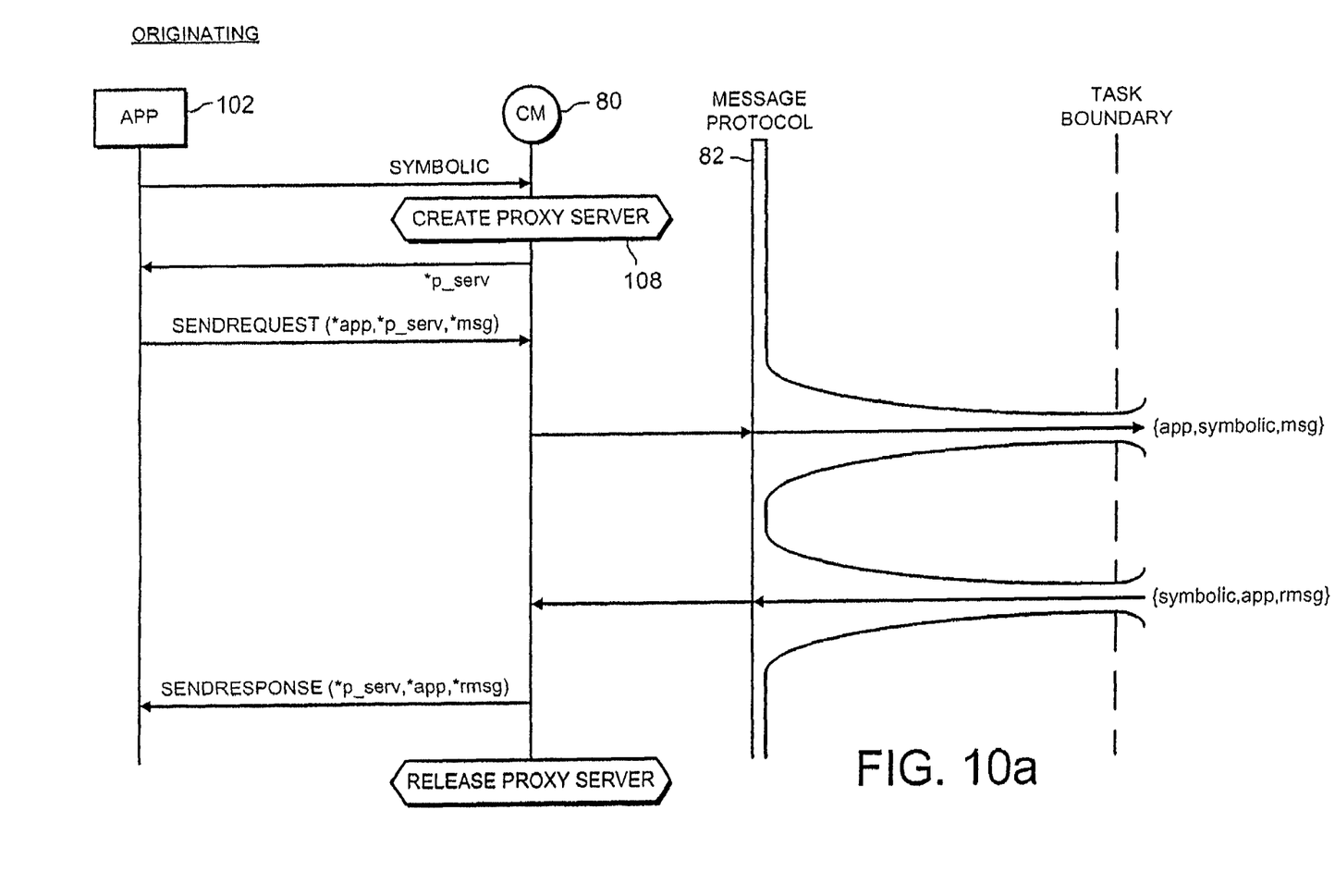
FIGS. 10a and 10b illustrate inter-task message delivery.
Figure 10B:
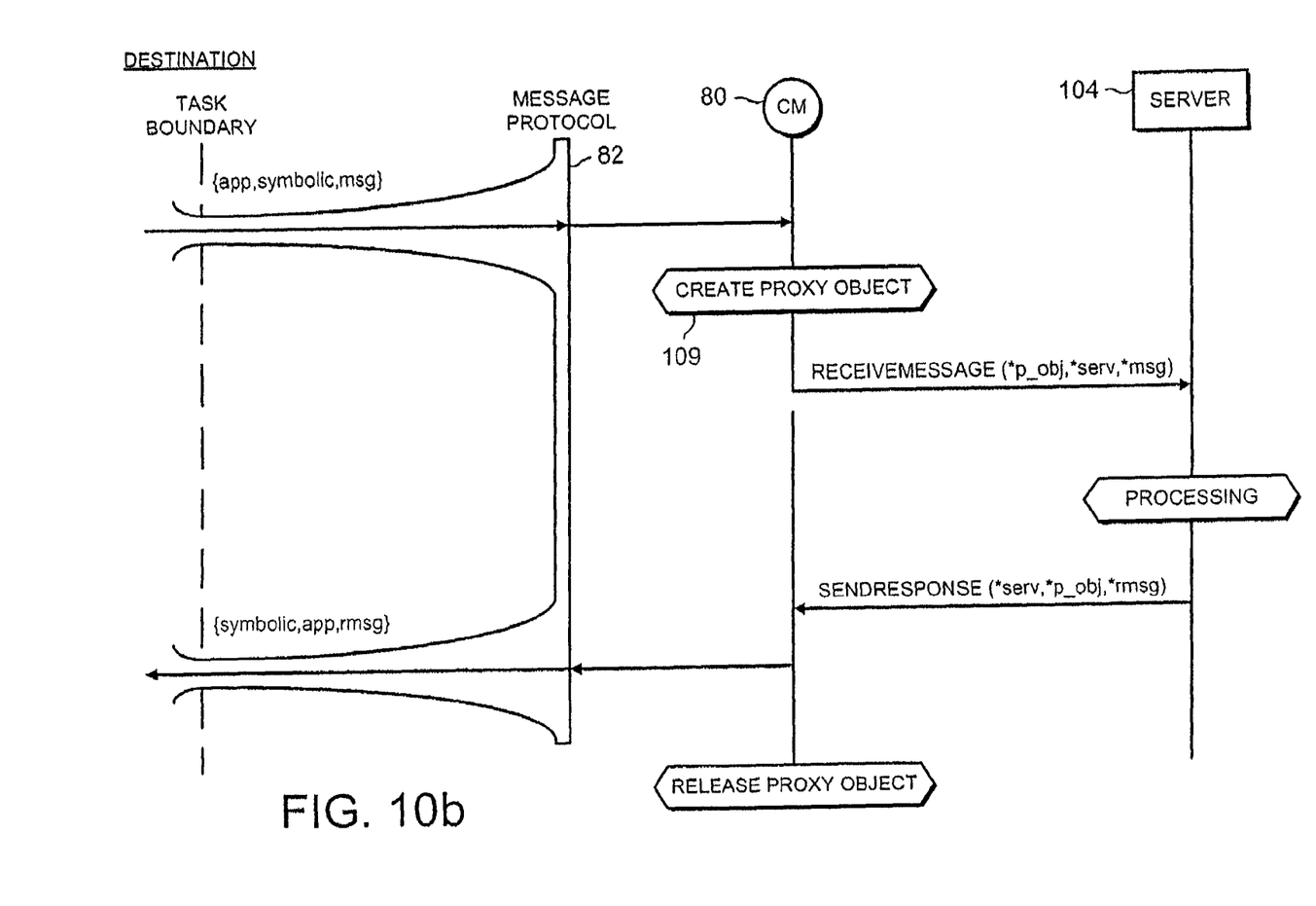

The process of inter-task communication is illustrated in FIGS. 10a and 10b. The connectivity layer comprising the communications manager 80 of the originating task, the communications manager 80 of the destination task and the inter linking message protocol 82, mediates communication between an application 102 in the originating task and a server 104 encapsulating a resource 106 in the destination task. The application 102 wishes to access a service. As before in inter-task communication, the application provides the symbolic address of the desired resource to the communications manager 80 of the originating task. The communications manager 80 is unable to find an associated object address in its routing table as the symbolic address relates to a service provided in another task. It is therefore aware that the desired service lies outside the task it controls. The communications manager creates a proxy server and returns a pointer *P_SERV pointing to the proxy server object to the application 102. The communications manager 80 in the originating task also creates a temporary entry in its resource routing table associating the symbolic resource address received with the object address P_SERV of the proxy server created. This temporary entry is flagged as a proxy. The application 102 on receiving the pointer to the proxy server calls the SENDREQUEST function in the proxy server. The SENDREQUEST function has as its arguments a pointer *APP pointing to the application 102, a pointer *P_SERV pointing to the proxy server and a pointer *MSG pointing to the body of the message being sent. The communications manager 80 responds to the calling of SENDREQUEST in the proxy server by accessing the message protocol 82 in the connectivity layer 70. The message protocol 82 transfers a message from the originating task to the destination task across the task boundary. The extra-task message sent includes the address APP of the originating application 102, the symbolic resource address associated with the pointer *P_SERV and the address of the message being sent.

The communications manager 80 in the destination task receives the message sent across the task boundary. From the symbolic resource address contained therein, it realises that the service required is within the task it controls.

The communications manager 80 therefore creates a proxy object 109 having an address P_OBJ. The communications manager 80 accesses its symbolic routing table to obtain the object address SERV associated with the symbolic resource address. The communications manager 80 then makes an association between the application address APP received in the message across the task boundary and the address of the created proxy object 109. The association preferably makes the address of the proxy object the same as the address APP. Then the communications manager 80 allocates the portion of memory containing the message MSG and pointed to by the pointer *MSG to its own task.

The communications manager 80 then calls the RECVMESSAGE function in the server 104. The RECVMESSAGE function has as its arguments the pointer *P_OBJ pointing to the proxy object 109, the pointer *SERV pointing to the server 104, and the pointer *MSG pointing to the message body now within the destination task. Consequently the arguments of the RECVMESSAGE function are pointers within the destination task only. The transaction does not cross the task boundary. The server receives the MSG and processes it accessing the resource 106. It then sends a reply message (RMSG) back towards the origin of the request. The reply message is sent by calling the function SENDRESPONSE in the proxy object 109. This function has as arguments *SERV, *P_OBJ, and *RMSG which is a pointer to the body of the reply message. The function SENDRESPONSE in the proxy object defines implicitly that a message sent by calling it is intended for another task. The communications manager 80 then sends the reply message from its task back to the originating task across the task boundary via the message protocol 82. The communications manager uses its symbolic routing table to replace the address of the server 104 (SERV) with the symbolic resource address and it uses the association it previously created between the address of the proxy object 109 and the address of the application 102 to send in the message across the task boundary, the symbolic address, the application address APP, and the address of the reply message RMSG. The communications manager 80 then releases the proxy object 109, removes the association between the proxy object address and the originating application address. APP and de-allocates the portion of the memory which held the message MSG.

The communications manager in the originating task 18 receives the extra-task message from the destination task via the message protocol 82. The communications manager 80 allocates the portion of the memory 16 holding the message RMSG to the task it controls. It uses the association it previously made between the symbolic resource address contained in the received message from the destination task with the address of the proxy server 108 to call the SENDRESPONSE function in the application 102. This function takes as its arguments *P_SERV pointing to the proxy server, *APP pointing to the application 102 and *RMSG pointing to the reply message now part of the same task. It will be appreciated that all the arguments of the function SENDRESPONSE are pointers within the originating task. The transaction does not cross the task boundary. Thus the application 102 receives the reply message RMSG. The communications manager 80 then releases the proxy server 108, removes the association of the address of the proxy server and the symbolic resource address from its symbolic routing table and de-allocates the portion of the memory 16 holding the message RMSG.

The preceding description describes a preferred implementation of the invention and preferred applications of the invention. It should be appreciated that other implementations and applications may be utilised without departing from the scope of the invention as claimed.

What is claimed is:

1. A radio handset comprising:
    processor means including memory, for performing functions of the handset by communicating between originating entities and destination entities, some of said entities being within the handset and at least one entity being locatable within an ancillary device;
    an interface coupled to the processor means and having a radio transceiver arranged for coupling to the ancillary device and communicating therewith to enhance the functions of the handset; and
    routing means, coupled to the processor means, and arranged to provide for communication between an entity in the handset and an entity in the ancillary device by enabling the creation of a proxy entity in the handset for transaction with the entity in the handset, the creation of the proxy entity in the ancillary device being for transaction with the entity in the ancillary device and for communication between the handset and ancillary device through the interface.

2. A radio handset as claimed in claim 1, wherein the routing means is arranged to associate each entity within the handset with a task and to provide for communication between an originating entity in an originating task and a destination entity in a destination task by using one or more intra-task transactions and, if necessary, inter-task communication, each transaction involving two entities associated with a same task, said routing means being arranged to provide for communication between an originating entity and a destination entity by enabling, if the originating and destination tasks are the same, the transaction of the originating entity and of the destination entity and by enabling, if the originating and the destination tasks are different, the creation of a proxy entity in the originating task for a transaction with the originating entity, and if necessary, the creation of a proxy entity in the destination task being for the transaction with the destination entity and for communication between the originating and destination tasks via the interface.

3. A radio handset as claimed in claim 1, wherein said originating entity is arranged to request a service using a symbolic address identifying the service and the routing means is arranged to determine from the symbolic address if the service is provided within the handset.

4. A radio handset as claimed in claim 3, wherein the routing means is arranged to determine from the symbolic address if the service is provided within the originating task.

5. A radio handset as claimed in claim 1, wherein said routing means addresses the request to the destination entity providing the identified service or to the proxy entity representing the destination entity in the handset.

6. A radio handset as claimed in claim 5, wherein said routing means addresses the request to the destination entity providing the identified service or to the proxy entity representing the destination entity in the originating task.

7. A radio handset as claimed in claim 1, wherein the originating entity is defined within the processor means.

8. A radio handset as claimed in claim 1, wherein the destination entity is defined within the processor means.

9. A radio handset as claimed in claim 2, wherein the originating entity is a first object, which is a first specialization of a base class, and the destination object is second object, which is a second specialization of the base class.

10. A radio handset as claimed in claim 9, wherein the proxy entity is a third object, being a third specialisation of the base class.

11. A radio handset as claimed in claim 10, wherein the third object encapsulates a means of communication between the handset and ancillary device.

12. A radio handset as claimed in claim 11, wherein the third object encapsulates a means for providing inter-task communication.

13. A radio handset as claimed in claim 9, wherein the second object encapsulates a resource for providing a service.

14. A radio handset as claimed in claim 9, wherein the first object is arranged to request services from any one of a plurality of second objects.

15. A radio handset as claimed in claim 9, wherein a transaction comprises one object calling a function in another object, the objects being in either the handset or the ancillary device.

16. A radio handset as claimed in claim 15, wherein a transaction comprises one object calling a function in another object, the objects being within a same task.

17. A radio handset as claimed in claim 16, wherein the function called in a transaction has as arguments a pointer to or an address of each of the objects within the same task.

18. A modular system comprising distributed modules including a radio handset and an ancillary device, said radio handset and ancillary device being arranged to use radio communication to enhance the handset's functionality,
    the radio handset comprising:
        processor means including memory, for performing functions of the handset by communicating between originating entities and destination entities, some of said entities being within the handset and at least one entity being within the ancillary device;
        a first interface coupled to the processor means and having a radio transceiver arranged for coupling to the ancillary device and communicating therewith to enhance the functions of the handset;
        first routing means, coupled to the processor means, and arranged to provide for communication between the originating entities and the destination entities using one or more transactions and, if necessary, communication to the ancillary device, at least one transaction involving two entities within the handset; and
    wherein the ancillary device comprises
        at least one entity; a second interface having a radio transceiver for communicating with the first interface; second routing means arranged to provide for communication between the originating entities and the destination entities using one or more transactions and, if necessary, communication with the handset, at least one transaction involving two entities in the ancillary device; and
        said first and second routing means being arranged to provide for communication between an entity in the radio handset and the entity in the ancillary device by enabling the creation of a proxy entity in the handset for transaction with the entity in the handset, the creation of a proxy entity in the ancillary device being for transaction with the entity in the ancillary device and for communication between the handset and ancillary device via the interface.

19. An ancillary device for augmenting functionality of a radio handset which performs functions thereof by communicating between originating entities and destination entities, some of said entities being within the handset, comprising:
    at least one entity;
    a second interface having a radio transceiver for communicating with the radio handset; and
    routing means arranged to provide for communication between the originating entities and the destination entities using one or more transactions and, if necessary, communication with the handset, at least one transaction involving two entities in the ancillary device, wherein the routing means is arranged to provide for communication between an entity in the radio handset and the entity in the ancillary device by creating a proxy entity in the ancillary device for transacting with the entity in the ancillary device and communicating via the interface.

* * * * *